United States Patent [19]

Yamanaka

[11] Patent Number: 4,774,625
[45] Date of Patent: Sep. 27, 1988

[54] MULTIPROCESSOR SYSTEM WITH DAISY-CHAINED PROCESSOR SELECTION

[75] Inventor: Kimio Yamanaka, Hyogo, Japan

[73] Assignee: Mitsubishi Denki Kabushiki Kaisha, Tokyo, Japan

[21] Appl. No.: 792,592

[22] Filed: Oct. 29, 1985

[30] Foreign Application Priority Data

Oct. 30, 1984 [JP] Japan ............................... 59-226825
Oct. 30, 1984 [JP] Japan ............................... 59-226826

[51] Int. Cl.$^4$ ............................................. G06F 15/16
[52] U.S. Cl. ................................................ 364/200
[58] Field of Search ... 364/200 MS File, 900 MS File; 340/825.5, 825.51; 370/85.91

[56] References Cited

U.S. PATENT DOCUMENTS 4,359,731 11/1982 Beauford et al. ............ 340/825.51
4,428,048 1/1984 Berlin, Jr. ..................... 364/200
4,435,758 3/1984 Lorie et al. .................... 364/200
4,542,455 9/1985 Demeure ........................ 364/200

Primary Examiner—Gareth D. Shaw
Assistant Examiner—Jonathan C. Fairbanks
Attorney, Agent, or Firm—Bernard, Rothwell & Brown

[57] ABSTRACT

A multiprocessor system includes a priority discriminator which passes a request signal from a master operation processing unit serially through a plurality of slave operation processing units in accordance with a predetermined priority sequence of the slave operation processing units until an idle slave operation processing unit having a processing capability called for by a command signal from the master operation processing unit is found. The priority discriminator interconnecting the slave operation processing unit relieves the master operation processing unit of priority and slave unit selection tasks.

2 Claims, 5 Drawing Sheets

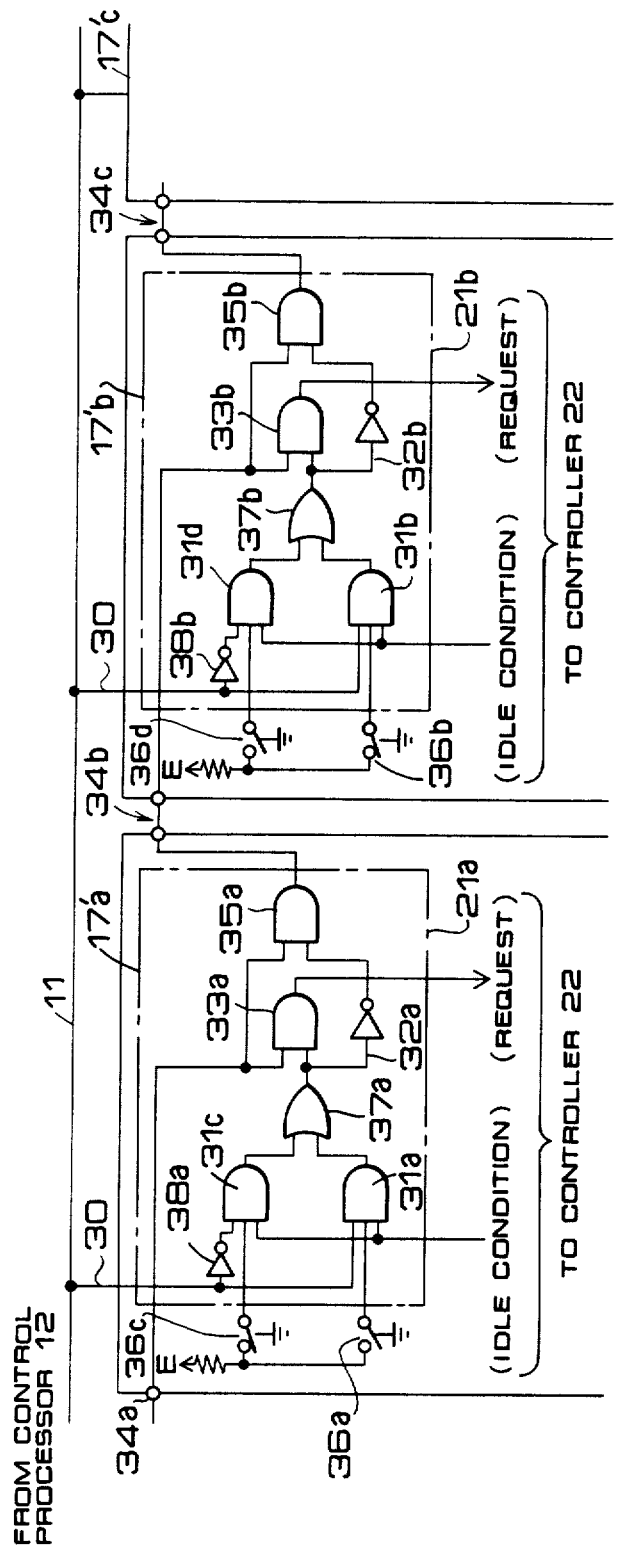

MULTIPROCESSOR SYSTEM WITH DAISY-CHAINED PROCESSOR SELECTION

BACKGROUND OF THE INVENTION

1. Field of the Invention

The present invention relates to a multiprocessor and particularly to a multiprocessor system, for example, a master slave system which ensures effective operation of different kinds of slave operation processing devices.

2. Description of the Prior Art

Various attempts have been made in conventional multiprocessor systems in order to improve performance as a whole by enhancing the parallel processing function. However, such attempts have encountered problems in the logic for assigning the processing to a plurality of operation processors, namely, for example, in the control systems for priority control and equal distribution of load.

As one example in the prior art of such parallel processing system for solving the problem described above, the distributional data transfer control system for parallel processor architecture indicated in the Japanese Patent Laid Open No. 57-172455 is known. The block diagram of such prior art system is shown in FIG. 1. This system distributes data to a plurality of operation processors. In FIG. 1, reference numeral 1 denotes the main bus; 2 denotes a control processor (master operation processing unit); 3, 3a-3c denote bus interface units; 4 denotes a resource controller; 5 denotes a main memory; 6, 6a-6c denote local memories and 7a-7c denote operation processors (slave operation processing units).

The conventional multiprocessor is constituted as described above and the system control is carried out by the control processor 2 and the main memory 5 where programs and data are stored.

First, for the execution of a program, the control processor 2 reads a program from the main memory 5 through the resource controller 4, main bus 1 and bus interface unit 3 for main memory 5 and recognizes the contents to be processed. In this case, actual processing operations are carried out by the operation processors 7a-7c. Therefore, in order to attain the maximum processing effect, the operations of bus interface units 3a-3c and local memories 6a-6c corresponding to respective operation units 7a-7c are preset in accordance with program. Thereafter, the control processor 2 decodes the program and reads required processing data from the main memory 5 and then supplies the control data required for processing and processing data to the pertinent operation processors 7a-7c of the operation processor 7 through the main bus 1. In this case, the operation processor among those 7a-7c for receiving each processing is predetermined by the operation and the parallel operations are carried with the maximum efficiency.

In the above conventional multiprocessor system, constitution is so established that the slave operation processing unit to be used for operations is predetermined. Therefore, it is necessary to preset the response of each bus interface unit and local memory in accordance with the control contents to be processed by the master operation processing unit. Moreover, if any of the operation processors in the slave operation processing unit fails, recalculation or reset of response is required. Further, such conventional multiprocessor system has a disadvantage that such calculation procedures and algorithms are complicated.

SUMMARY OF THE INVENTION

The principal object of the present invention is to provide an effective multiprocessor system which has solved disadvantages of said prior art system.

It is another object of the present invention to provide a multiprocessor system wherein it is not required to preset the operation sequence of a plurality of slave operation processing units which carry out processings for a certain processing command, the slave operation processing unit itself monitors the conditions thereof and judges the possibility of execution of data processings, and the master operation processing unit can conduct the processing without detection of the conditions of a plurality of slave operation processing units.

It is a further object of the present invention to provide a multiprocessor system wherein different kinds of slave operation processing units are capable of efficiently realizing the operations in accordance with the commands even in case the slave operation processing units receive the commands for different kinds of operations from the master operation processing unit.

Further objects and features of the present invention will become apparent from the detailed description of the preferred embodiment thereof with reference to the accompanying drawings.

BRIEF DESCRIPTION OF THE DRAWINGS

FIG. 7 is a schematic diagram indicating another embodiment of the present invention.

DETAILED DESCRIPTION OF THE PREFERRED EMBODIMENTS

Figure 1:
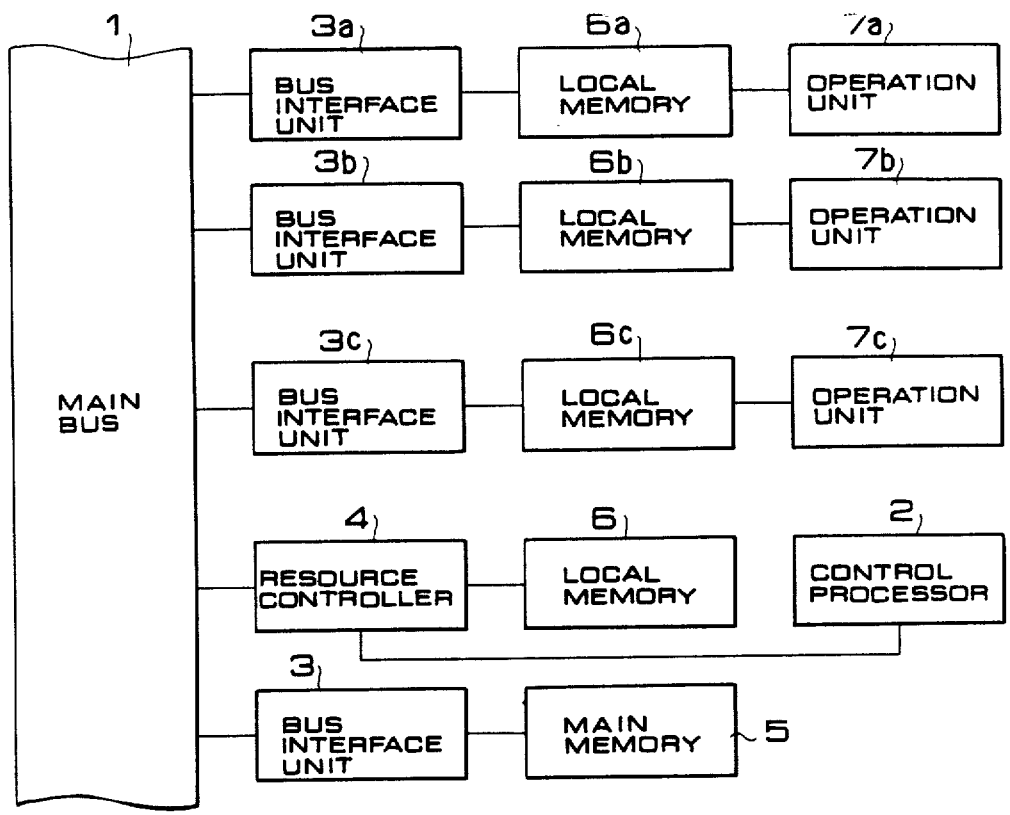
FIG. 1 is a block diagram indicating the outline of a conventional multiprocessor system.
Figure 2:
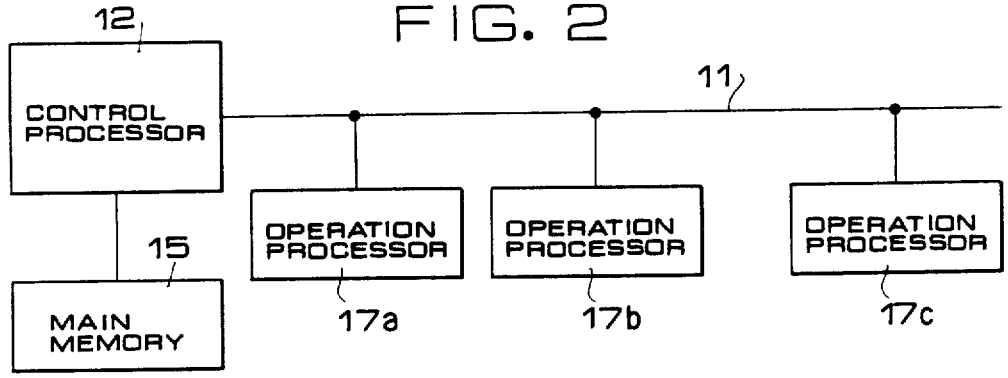
FIG. 2 is a block diagram indicating an embodiment of the present invention.

FIG. 2 shows the structure indicating an embodiment of the present invention, wherein 11 denotes the main bus, 12 a control processor (master operation processing unit), 15 main memory storing programs and data to be processed by the system of the present invention, 17a-17c operation processors (slave operation processing units) which execute actual operation processings with the control information and data sent from the control processor 12.

Figure 3:
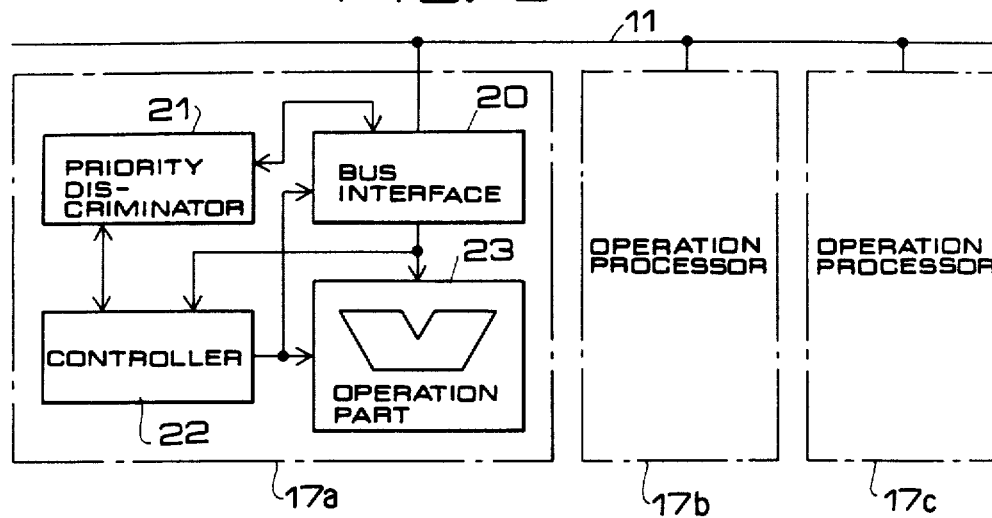
FIG. 3 is a block diagram indicating the essential part of the operation processor shown in FIG. 2.
Figure 4:
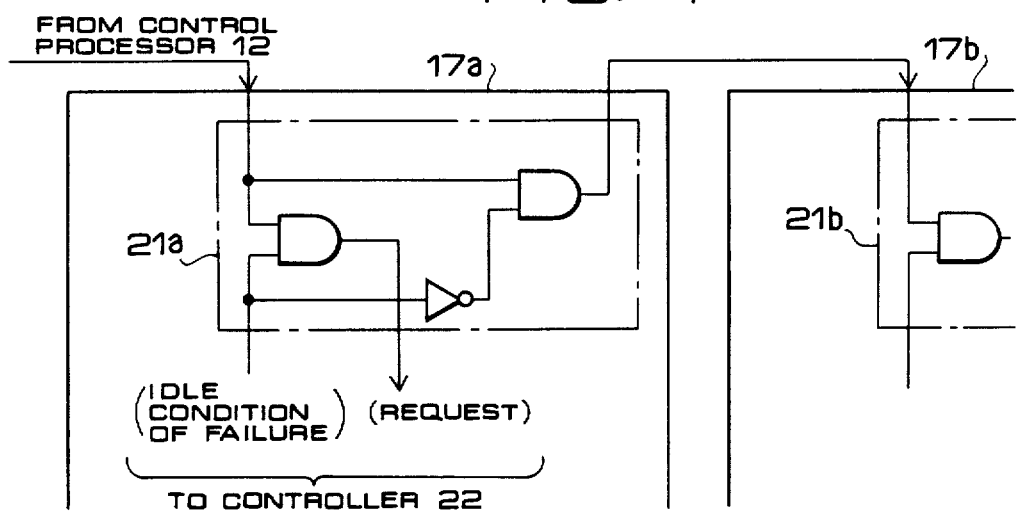
FIG. 4 is a schematic diagram indicating the essential part of FIG. 3.

FIG. 3 shows a block diagram indicating the essential part of operation processor 17a shown in FIG. 2. FIG. 4 is a schematic diagram indicating the essential part of FIG. 3.

In FIGS. 3 and 4, reference numeral 20 shows a bus interface which receives control information (processing content) and data to be processed sent from the main bus 11 and returns the result of processing to the main bus 11, 21 a priority descriminator which determines the order of priority in processing of the processors 7a-7c, 22 a controller for operating the plurality of operation processors 17a–17c, and 23 an operation part which executes processings in accordance with the data supplied.

Figure 5:
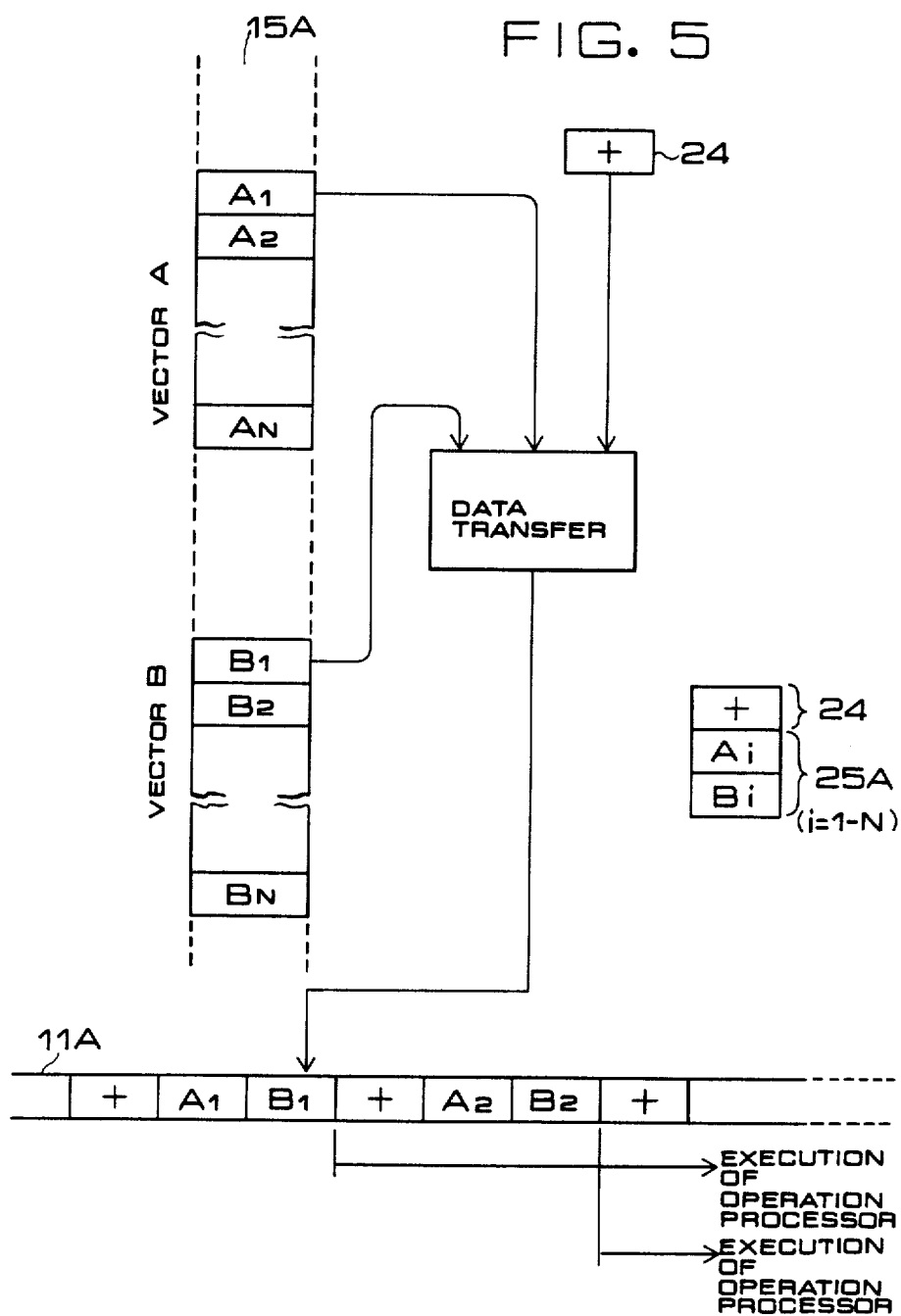
FIG. 5 is an explanatory view of data flow shown in FIG. 2.
Figure 6:
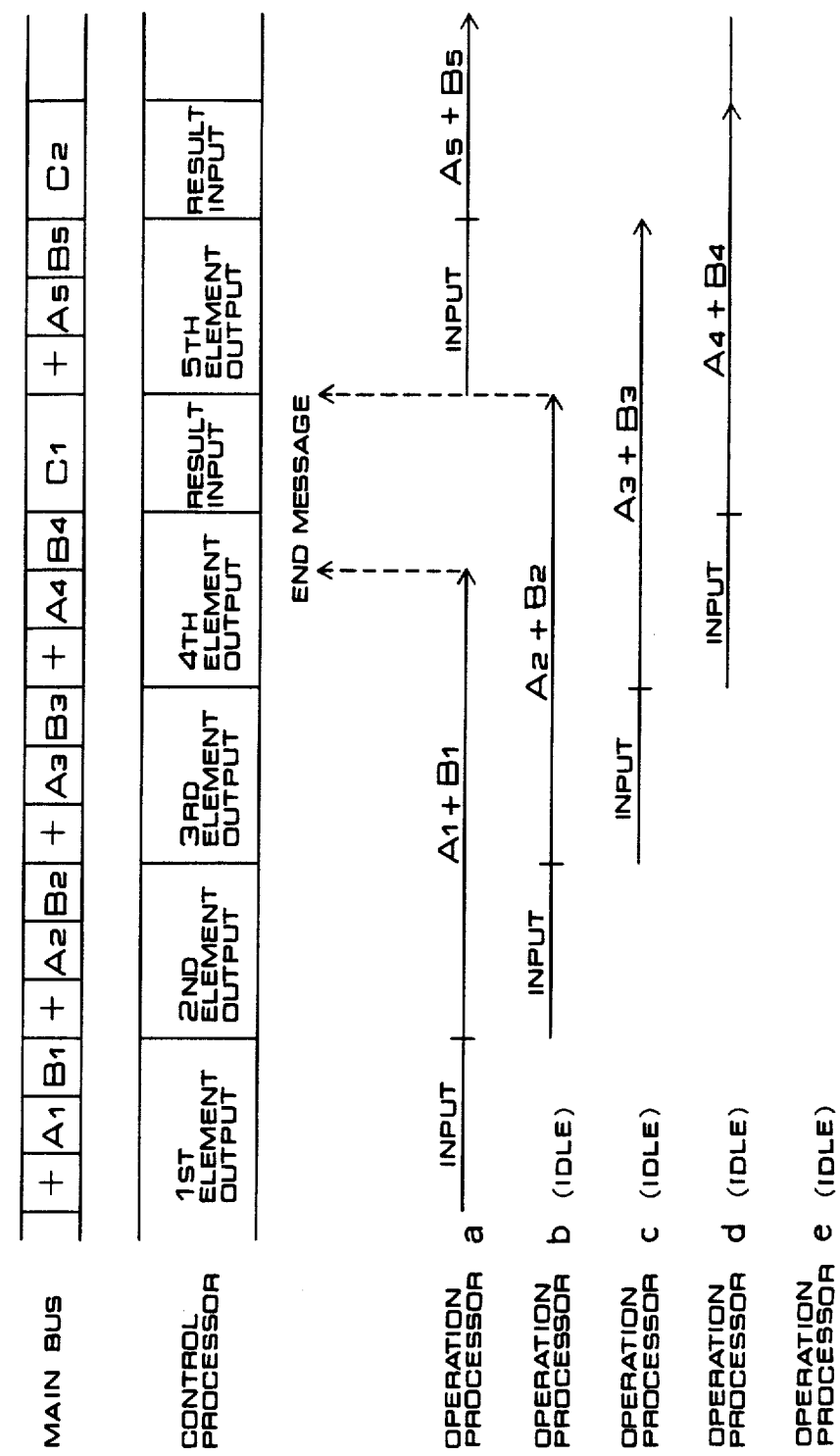
FIG. 6 is a diagram of a processing procedure indicating an example ($Ci = Ai + Bi$) of operation of the embodiment in FIG. 2.

The operations for addition of vector data indicated in FIG. 5 in the multiprocessor of FIGS. 2–4 are explained by referring to FIGS. 2–4 and 6.

The control processor 12 recognizes the addition of vector data by reading the program 15A on the main memory 15 and further judges the storing location of operand data 25A for vector operations. Thereafter, the control processor 12 judges the addition of vectors and continuously sends the addition command (+)24 and two operand data (Ai, Bi) 25A to the main bus 11A. Here, if the operation processor near the control processor 12 among the operation processors 17a–17c is given a higher priority, when said data is placed on the main bus 11, the idle one of operation processors 17a–17c having the highest priority fetches the data and starts the internal processings. In this case, the priority for the processings by operation processors 17a–17c can be realized by joining respective operation processors 17a–17c by a method such as the daisy chain. When operation result is obtained, the operation end message is sent to the control processor 12 from the operation processors 17a–17c. Thereby, the control processor 12 fetches the operation result of operation processors 17a–17c to the main memory 15. Thereafter the operation processors 17a–17c become idle. Operation of the next vector element is carried out by the idle operation processor given the highest priority among the idle operation processors 17a–17c.

Next, here it is presumed that any one of the operation processors 17a–17c fails due to some trouble. In this case, the control processor 12 usually receives the data informing the failure of one of operation processors 17a–17c and is required to change the algorithm for data supply. However, in the multiprocessor system of the present invention, the defective one of operation processors 17a–17c is set in the busy condition. Thereby, data processing is supplied to the other operation processors among 17a–17c for transfer of processing.

In the above embodiment, four basic operation rules of vector are indicated as the functions of operation processors 17a–17c, but those which can be used for functional operations are capable of showing the same effect.

In the above embodiment, the control information and data are transferred serially for the supply of data to the operation processors 17a–17c from the control processor 12. However, in case high speed characteristic is required, the control information and data may be transferred in parallel.

Moreover, FIG. 7 shows another embodiment of the present invention wherein the essential parts of modification of the operation processors 17a–17c are indicated around the center part of priority discriminator 21 shown in FIG. 3. In FIG. 7, reference numeral 30 denotes a control line for receiving control command information given through the main bus 11 from the control processor 12 shown in FIG. 2. In this embodiment, the information of this control command is L (low level) in case it is the command for the four rules of operations (basic operations) and H (high level) in case it is the command for the trigonometric functional operation (functional operation). The AND circuits 31a–31d respectively receive on first inputs the idle condition (or busy condition) of the operation processors 17a or 17b as a result of monitoring from the respective controller 22 (FIG. 3), receive on second inputs the preset content (36a–36d) for the type of operational function of the operation processors 17'a or 17'b, and receive on third inputs the respective noninverted and inverted (from inverters 38a, 38b) control commands 34a and 34b. Numerals 32a, 32b are output signals of OR gates 37a, 37b which have respective inputs connected to the outputs of the AND circuits 31a–31d. In case one or both of the operational processors 17'a, 17'b are idle and of the type called for in the command signal, the corresponding output signal or signals 32a, 32b are significant and applied to one input of respective AND circuits 33a, 33b and through inverters 32a, 32b to inputs of respective AND circuits 35a, 35b. A request signal 30a from the control processor 12 is applied to second inputs of the AND circuits 33a and 35a in the highest priority slave processor 17'a. If the output 32a is significant, the request signal is passed by AND circuit 33a to the controller 22 of slave operational processor 17'a to select this processor. If the output 32a is low, then AND circuit 35a passes the request signal on line 34b to the slave processor 17'b which has the next lower priority. When a request signal is accepted by an slave processor 17'a, 17'b, the request signal is not passed by the AND circuit to the next lower priority operational processor. The setters 36a–36d are used for setting a kind of operational function of the operation processors 17'a or 17'b. In the case of this embodiment, switches are used. For the four rules of operations, the lower side setter 36a or 36b is set OFF, while the upper side setter 36c or 36d is set ON. For the functional operation of trigonometric function, the setter 36a or 36b is set ON and the setter 36c or 36d is set OFF.

In the multiprocessor system constituted as shown in FIG. 7, if the control command, for example, is issued for the operation of trigonometric function from the control processor 12, the H level signal is input to each of operation processors 17'a and 17'b from the control line 30. In this embodiment, the operation processor 17'a has the highest priority for the execution of processing. This operation processor is mainly used for four rules of operation and the setters 36a, 36c are preset for four rules of operation, and thus, even if this operation processor 17'a is idle, the AND circuits 31a, 31c do not accept the control command since the H level signal from the control line 30 is inverted by inverter 38a to disable the AND circuit 31c disabled by the L level from the setter 36a. With both AND circuits 31c and 31a disabled, the output of OR circuit 37a becomes L level and the operation processor 17'a does not accept the control command for the four rules of operation.

Therefore, the request signal given from the control processor 12 through the signal line 34a to is passed the operation processor 17'b through AND circuit 35a and the signal line 34b. This operation processor 17'b has the function of operation for trigonometric function. The setter 36b which indicates such function is set ON. Therefore, the AND circuit 31b provides a significant output when it receives the H level from the control line 30 under the condition that the AND circuit 31b is receiving an H idle signal from the controller 22. Then the OR circuit 37b becomes valid, namely, the output 32a goes to the H level. Thereby the AND circuit 33b is enabled and passes the request signal for execution of processing the data to the controller 22. In the event that the operation processor 17'b is not idle, AND circuit 31b is disabled and the request signal is transferred to the operation processor 17'c in the next stage.

In the above embodiment, the setters 36a-36d are provided respectively to the outside of priority discriminators 21a, 21b but the setters 36a-36d can be located anywhere within the operation processors 17'a, 17'b.

Moreover, in the above embodiment the operational function is classified into two kinds of operations of four rules of operation and trigonometric functional operation. These may further be classified and other classification function may also be employed. In addition, functions of operation processors 17'a-17'c are classified, for convenience, by the setters 36a-36d which can be changed by the switches, but such functions can also be fixed. Meanwhile, discrimination of priority is indicated by so-called daisy chain system but it may be indicated by the polling or other systems.

The present invention is constituted as described above and therefore it provides such excellent effects that not only the data supply algorithm of master operation processing unit is simplified but also processing can be executed without any modification of algorithm when a slave operation processing unit fails or a slave operation processing unit is added to elevate the capacity so as to expand the system, and moreover the master operation processing unit can distribute the processings without considering the processing time of slave operation processing unit and the system which shows maximum capability can be constituted.

According to the present invention, different slave operation processing units for operation processing types can be acommodated within the multiprocessor system and system performance can be improved. The present invention also provides the effect that a very efficient system depending on the application frequency of operation types can be constituted by changing the number of slave operation processing units for each operation type to be accommodated in accordance with the processing function of the system.

What is claimed is:

1. A multiprocessor system comprising
a bus,
a master operation processing unit connected to said bus for generating on said bus data to be processed and a command for processing the data,
a plurality of slave operation processing units connected to said bus for receiving the data and the command from said master operation processing unit,
said slave operation processing unit including a priority discriminator which sequentially selects the slave operation processing units in a preset priority sequence,
said priority discriminator also including means for determining conditions of each of said slave operation processing units and means for initiating execution of the command in the first slave operation processing units selected in the preset priority sequence which has its determined conditions meeting preselected conditions, and
said initiated slave operation processing unit including means for processing the data in accordance with the command;
each of said slave operation processing units including a controller having a condition indicating output, a first AND circuit which is responsive to an output from said master operation processing unit and the output from said controller, a second AND circuit having an inverter connected to one input thereof, and which is responsive to the output from said master operation processing unit applied to another input and the output of said controller applied to the inverter, and means connected to outputs of the first and second AND circuits for initiating the controller when the condition indicating output meets a predetermined condition and for passing the output from the master operation processing unit to the lext lower priority slave operation processing unit when the condition indicating output does not meet the predetermined condition.

2. A multiprocessor system comprising:
(a) a bus,
(b) a master operation processing unit which generates data to be processed and issues commands for processing the data on said bus,
(c) a plurality of slave operation processing units which are driven by said commands sent from said master operation processing unit through said bus to process the data,
(d) a plurality of setters within the respective slave operation processing units for selecting the operation modes of a processor for basic operations or functional operations, and
(e) a priority discriminator for receiving settings of said setters, results of monitoring for busy condition of said slave operation processing units, and a control command sent from said master operation processing unit calling for basic operations or functional operations, and connected with the slave operation processing units for selecting the slave operation processing units in a predetermined priority and in accordance with an absence of the busy condition and the concurrence of the basic operation setting or the functional operation setting with the control command;
each of said slave operation processing units being composed of first and second AND circuits which receive output signals from said setters, an OR circuit which receives outputs of said AND circuits, an inverter which is connected to the output side of said OR circuit, a third AND circuit which receives the outputs of said OR circuit and said master operation processing unit, and a fourth AND circuit which receives the outputs of said inverter and said master operation processing unit and provides an output to the slave operation processing unit having the next lower priority.

* * * * *